US011395181B2

(12) United States Patent
Nemeth et al.

(10) Patent No.: US 11,395,181 B2
(45) Date of Patent: Jul. 19, 2022

(54) ON-DEMAND TRANSMISSION OF ABORTED HARQ CODEBOOKS IN MOBILE COMMUNICATIONS

(71) Applicant: MediaTek Singapore Pte. Ltd., Singapore (SG)

(72) Inventors: Jozsef Nemeth, Cambridge (GB); Abdelkader Medles, Cambridge (GB); Mohammed S Aleabe Al-Imari, Cambridge (GB); Abdellatif Salah, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 76 days.

(21) Appl. No.: 16/880,951

(22) Filed: May 21, 2020

(65) Prior Publication Data

US 2020/0382997 A1 Dec. 3, 2020

Related U.S. Application Data

(60) Provisional application No. 62/853,779, filed on May 29, 2019.

(51) Int. Cl.
*H04W 56/00* (2009.01)
*H04W 28/06* (2009.01)
(Continued)

(52) U.S. Cl.
CPC .......... *H04W 28/06* (2013.01); *H04B 7/0478* (2013.01); *H04B 7/0626* (2013.01);
(Continued)

(58) Field of Classification Search
CPC ..... H04W 28/06; H04W 76/11; H04W 76/27; H04W 72/042; H04W 72/0446;
(Continued)

(56) References Cited

U.S. PATENT DOCUMENTS

| 5,757,784 A * | 5/1998 | Liebowitz .......... H04B 7/18523 370/321 |
| 2015/0205668 A1 * | 7/2015 | Sundaram ............. G06F 3/0688 714/6.24 |

(Continued)

FOREIGN PATENT DOCUMENTS

| CN | 108289015 A | 7/2018 |
| TW | 1497941 B | 8/2015 |
| WO | WO 2018143785 A1 | 8/2018 |

OTHER PUBLICATIONS

China National Intellectual Property Administration, International Search Report and Written Opinion for PCT/CN2020/092474, dated Jul. 30, 2020.

(Continued)

*Primary Examiner* — Sai Ming Chan
(74) *Attorney, Agent, or Firm* — Han IP PLLC; Andy M. Han

(57) ABSTRACT

An apparatus aborts a transmission of a first message of a first type of traffic in a first slot or sub-slot without resuming the transmission in the first slot or sub-slot. The apparatus then stores a payload of the first message. The apparatus later retransmits the payload in full in a second slot or sub-slot that is subsequent the first slot or sub-slot.

18 Claims, 10 Drawing Sheets

(51) Int. Cl.
| | |
|---|---|
| *H04L 1/18* | (2006.01) |
| *H04W 72/04* | (2009.01) |
| *H04L 5/00* | (2006.01) |
| *H04W 76/27* | (2018.01) |
| *H04B 7/06* | (2006.01) |
| *H04W 76/11* | (2018.01) |
| *H04B 7/0456* | (2017.01) |

(52) U.S. Cl.
CPC ............ *H04L 1/189* (2013.01); *H04L 1/1887* (2013.01); *H04L 5/0055* (2013.01); *H04W 72/042* (2013.01); *H04W 72/0446* (2013.01); *H04W 76/11* (2018.02); *H04W 76/27* (2018.02)

(58) Field of Classification Search
CPC ... H04B 7/0478; H04B 7/0626; H04L 1/1887; H04L 1/189; H04L 5/0055
USPC .......................................................... 370/329
See application file for complete search history.

(56) References Cited

U.S. PATENT DOCUMENTS

| | | | |
|---|---|---|---|
| 2018/0184468 A1* | 6/2018 | Chien | H04W 72/0406 |
| 2019/0165984 A1* | 5/2019 | Shapin | H04L 27/2666 |
| 2019/0166625 A1* | 5/2019 | Nam | H04L 1/0058 |
| 2019/0229970 A1* | 7/2019 | Bhattad | H04L 5/001 |
| 2020/0195386 A1* | 6/2020 | Marinier | H04L 1/1896 |
| 2020/0367278 A1* | 11/2020 | Hosseini | H04L 5/0023 |

OTHER PUBLICATIONS

Mediatek Inc., Multiple HARQ procedures and intra-UE UCI prioritization, 3GPP TSG RAN WG1 Meeting #96bis, R1-1904504, Xi'an, China, Apr. 8-12, 2019.
Ericsson, UCI Enhancements for NR URLLC, 3GPP TSG RAN WG1 Meeting #97, R1-1906092, Reno, USA, May 13-17, 2019.
Sony, UCI enhancements for eURLLC, 3GPP TSG RAN WG1 #97, R1-1906841, Reno, USA May 13-17, 2019.
Taiwan Intellectual Property Office, Office Action for Taiwan Patent Application No. 109117300, dated Mar. 24, 2021.

* cited by examiner

| Payload Content | Single Last Codebook | Single Selected Codebook | Multiple Selected Codebooks | All Codebooks | All HARQ Processes |
|---|---|---|---|---|---|
| Option S1 | Yes | No | No | No | N/A |
| Option S2A | Yes | Yes | Yes | No | N/A |
| Option S2B | No | No | No | Yes | N/A |
| Option S3 | Yes | No | No | No | N/A |
| Automatic PUCCH | Yes | No | Yes | No | No |
| PUCCH | Yes | Yes | Yes | Yes | Yes |
| PUSCH | Yes | Yes | Yes | Yes | Yes |

ON-DEMAND TRANSMISSION OF ABORTED HARQ CODEBOOKS IN MOBILE COMMUNICATIONS

CROSS REFERENCE TO RELATED PATENT APPLICATION

The present disclosure is part of a non-provisional patent application claiming the priority benefit of U.S. Provisional Patent Application No. 62/853,779, filed on 29 May 2019, the content of which being incorporated by reference in its entirety.

TECHNICAL FIELD

The present disclosure is generally related to mobile communications and, more particularly, to on-demand transmission of aborted hybrid automatic repeat request (HARQ) codebook(s) in mobile communications.

BACKGROUND

Unless otherwise indicated herein, approaches described in this section are not prior art to the claims listed below and are not admitted as prior art by inclusion in this section.

The Release 16 (Rel-16) of the $3^{rd}$ Generation Partnership Project (3GPP) Technical Specification (TS) for New Radio (NR) allows configuration of two simultaneous codebook determination procedures. For example, one of the two simultaneous codebook determination procedures could be for enhanced Mobile Broadband (eMBB) and the other for Ultra-Reliable Low-Latency Communication (URLLC). In this example, each downlink control information (DCI) would channel the respective acknowledgement and negative acknowledgement (ACK/NACK) bits to one or the other procedure. However, in case of collision between two HARQ codebooks of different priorities, the one with a lower priority (e.g., codebook for eMBB) would be discarded (e.g., pre-empted/aborted if transmission is ongoing). This would normally trigger retransmission of all downlink (DL) packets that were acknowledged in the deprioritized HARQ codebook. Therefore, there is a need for a solution to recover the aborted lower-priority (e.g., eMBB in this example) codebook.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to on-demand transmission of aborted HARQ codebook(s) in mobile communications. Under various proposed schemes in accordance with the present disclosure, a solution for recovering aborted codebook(s) is introduced.

In one aspect, a method may involve a processor of an apparatus aborting a transmission of a first message of a first type of traffic in a first slot or sub-slot without resuming the transmission in the first slot or sub-slot. The method may also involve the processor storing a payload of the first message. The method may further involve the processor retransmitting the payload in full in a second slot or sub-slot that is subsequent the first slot or sub-slot.

In another aspect, a method may involve a processor of an apparatus receiving a trigger from a wireless network. The method may also involve the processor reporting status of one or more HARQ processes to the wireless network responsive to receiving the trigger.

It is noteworthy that, although description provided herein may be in the context of certain radio access technologies, networks and network topologies such as $5^{th}$ Generation (5G)/NR, the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to on-demand transmission of aborted HARQ codebook(s) in mobile communications. According to the present disclosure, a number of possible solutions may be implemented separately or jointly. That is, although these possible solutions may be described below separately, two or more of these possible solutions may be implemented in one combination or another.

Figure 1:
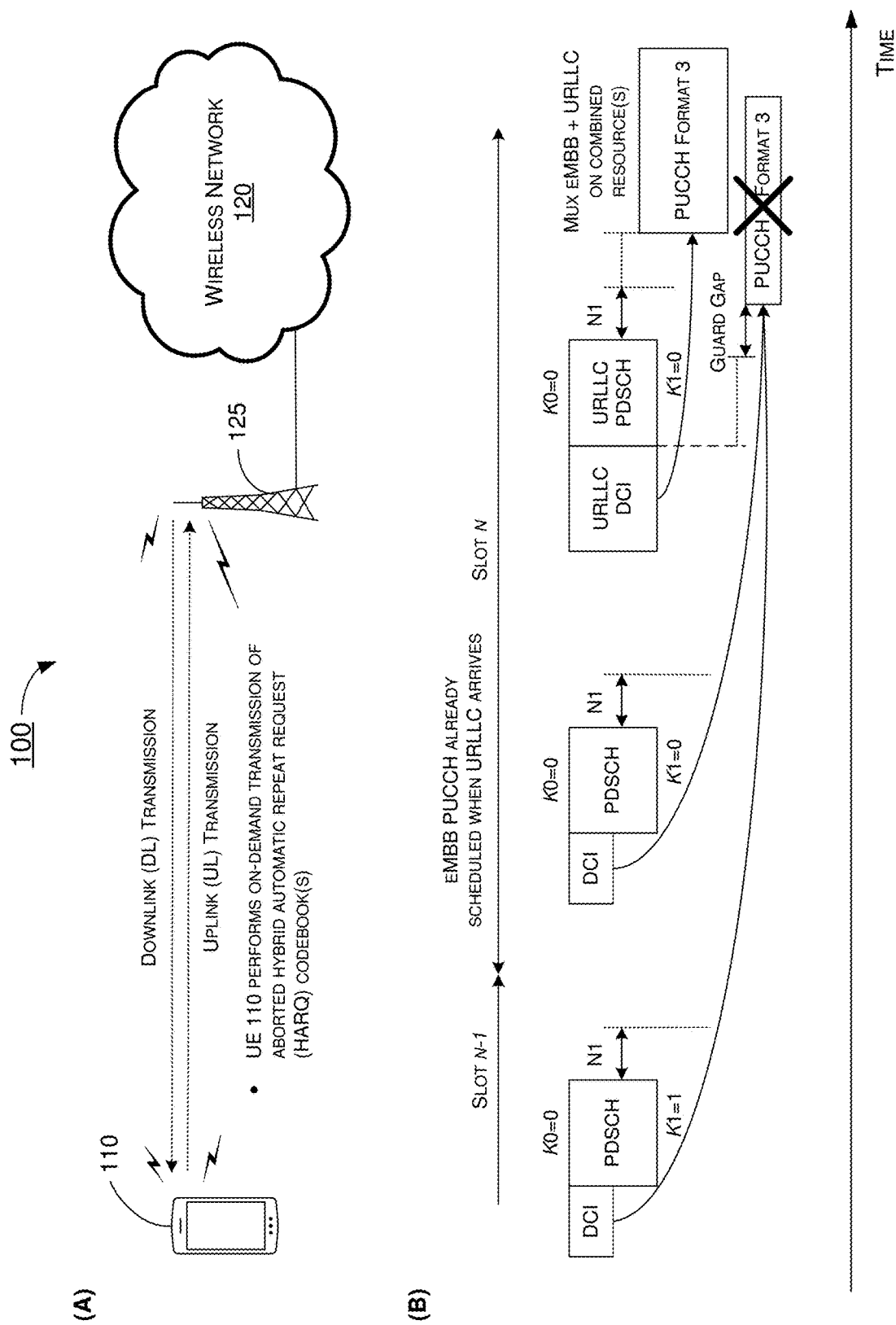
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 7 illustrate examples of implementation of various proposed schemes in network environment 100 in accordance with the present disclosure. The following description of various proposed schemes is provided with reference to FIG. 1~FIG. 7.

Referring to part (A) of FIG. 1, network environment 100 may involve a UE 110 in wireless communication with a wireless network 120 (e.g., a 5G NR mobile network). UE 110 may be in wireless communication with wireless network 120 via a base station or network node 125 (e.g., an eNB, gNB or transmit-receive point (TRP)). Referring to part (B) of FIG. 1, uplink (UL) transmission of HARQ codebooks for eMBB PUCCH may have already been scheduled by DCI in slot n−1 and slot n when DCI scheduling UL transmission of HARQ codebook for URLLC arrives in slot n. As a result, the UL transmission of the HARQ codebooks for eMBB, the priority of which being lower than that of URLLC, may be aborted. Accordingly, UE 110 may perform on-demand transmission of aborted HARQ codebook(s) in mobile communications based on any of the proposed schemes in accordance with the present disclosure, as described herein.

Under a first proposed scheme in accordance with the present disclosure, in case of collision between two HARQ codebooks of different priorities, UE 110 may first abort UL transmission of information and/or data associated with a lower-priority codebook at the earliest without ever resuming retransmission thereof. Next, under the first proposed scheme, UE 110 may store the actual raw payload bits (e.g., HARQ codebook) using one of multiple options. In a first option (hereinafter referred to as "Option S1"), UE 110 may store the raw payload bits until they are overwritten by the next cancellation (with one but not more codebook stored). In a second option (hereinafter referred to as "Option S2"), UE 110 may utilize a first-in-first-out (FIFO) arrangement in storing the raw payload bits associated with each stored codebook until they are overwritten by multiple cancellations. Under one approach in Option S2 (hereinafter referred to as "Option S2a"), at a later time, UE 110 may retrieve selected codebook(s) that is/are retransmitted given that a request specifies, for each codebook, a slot (or sub-slot, depending on the granularity of K1) where the original HARQ was scheduled. Under another approach in Option S2 (hereinafter referred to as "Option S2b"), at a later time, UE 110 may retrieve all the FIFO content that is retransmitted given that a response specifies, for each codebook, the slot (or sub-slot, depending on the granularity of K1) where the original HARQ was scheduled. In a third option (hereinafter referred to as "Option S3"), UE 110 may store the raw payload bits until they are overwritten by the next HARQ codebook transmission, thereby supporting retransmission of a HARQ codebook regardless whether deprioritization took place or not.

Furthermore, under the first proposed scheme, UE 110 may retransmit in full later autonomously using originally assigned physical uplink control channel (PUCCH) resource(s) in a later slot (or sub-slot, depending on the granularity of K1). This may be performed following one of Options S1, S2a and S3. Alternatively, under the first proposed scheme, UE 110 may retransmit in full upon being requested (e.g., by network node 125), using independent, arbitrary resource(s), possibly combined with other payload(s). This may be accomplished using one of two options. In a first option (hereinafter referred to as "Option R1"), UE 110 may transmit in full as a report when requested by a specific UL-DCI. This may be performed following one of Options S1, S2 and S3. For instance, a mechanism similar to that of aperiodic channel state information (A-CSI) may be utilized. In a second option (hereinafter referred to as "Option R2"), UE 110 may transmit in full upon receiving an implicit request (e.g., signaling in DL-DCI) to concatenate stored uplink control information (UCI) to new UCI. This may be performed following one of Options S1 and S2. More detailed description of the first proposed scheme is provided below.

Under a second proposed scheme in accordance with the present disclosure, in case of collision between two HARQ codebooks of different priorities, UE 110 may transmit HARQ acknowledgement (HARQ-ACK) based on current status of the HARQ process(es). For instance, network node 125 may transmit a trigger (e.g., using an UL-DCI or a DL-DCI) and, in response, UE 110 may report the current ACK/NACK status for all the HARQ processes configured by network node 125. Instead of having the status of all the configured HARQ processes to be reported, the HARQ process(es) for which UE 110 is to report the ACK/NACK may be signaled by network node 125 as part of the UL-DCI or DL-DCI. It is noteworthy that, under the second proposed scheme, there is no storage of payload bits required. More detailed description of the second proposed scheme is provided below.

Figure 2:
FIG. 2 is a diagram of an example table summarizing various proposed schemes in accordance with the present disclosure.

FIG. 2 illustrates an example table 200 summarizing above-described proposed schemes in accordance with the present disclosure. That is, table 200 lists various combinations of storage, erasing and retransmission methods in implementing the proposed schemes. For instance, table 200 shows storage of payload content under Option S1 may be implemented for a single last codebook, but not for a single selected codebook, multiple selected codebooks or all codebooks. As shown in Table 200, storage of payload content under Option S2s may be implemented for a single last codebook, a single selected codebook or multiple selected codebooks, but not for all codebooks. As shown in Table 200, storage of payload content under Option S2b may be implemented for all codebooks, but not for a single last codebook, a single selected codebook or multiple selected codebooks. As shown in Table 200, storage of payload content under Option S3 may be implemented for all codebooks, but not for a single last codebook, a single selected codebook or multiple selected codebooks. As shown in Table 200, storage of payload content of automatic PUCCH may be implemented for a single last codebook, but not for a single selected codebook, multiple selected codebooks or all codebooks. As shown in Table 200, storage of payload content of PUCCH may be implemented for a single last codebook, a single selected codebook, multiple selected codebooks, all codebooks and all HARQ processes. As shown in Table 200, storage of payload content of physical uplink shared channel (PUSCH) may be implemented for a single last codebook, a single selected codebook, multiple selected codebooks, all codebooks and all HARQ processes.

Under the first proposed scheme, with respect to storage, UE 110 may store the bits to be transmitted when a HARQ codebook transmission is aborted for prioritizing another transmission. In Option S1, in an event that a HARQ codebook transmission is aborted (and hence needs to be stored) when another HARQ codebook is already stored, the latest codebook may overwrite the earlier one, with a maximum one codebook being stored at a time. In Option S2, in an event that a HARQ codebook transmission is aborted and there is a limit on the number or total size of codebooks stored, the earliest HARQ codebook(s) may be overwritten by the latest one, with more than one codebook being stored at a time. In Option S3, each HARQ codebook transmission, whether aborted or not, may overwrite content in the storage (e.g., a memory device in UE 110) which may store the last HARQ codebook at any given time. This feature may be utilized when PUCCH is transmitted as normal (e.g., no de-prioritization) while network node 125, having failed to decode the PUCCH transmission, asks for retransmission. As an option, under the proposed scheme, aborted codebook(s) may not be overwritten by non-aborted codebook(s).

Under the first proposed scheme, with respect to triggering of retransmission and resource assignment, in Option R1 network node 125 may send UL-DCI to UE 110 to trigger retransmission as PUSCH. Advantageously, since control information would be transmitted on PUSCH just as A-CSI, the same mechanism may be utilized. Under a first approach in Option R1 (hereinafter referred to as "Option R1-1"), a new DCI field may be introduced. For instance, a single bit as the new DCI field may be used to trigger retransmission. Alternatively, or additionally, slot index (or indices) pointing back in time may be used to select the codebook(s) requiring retransmission. Under a second approach in Option R1 (hereinafter referred to as "Option R1-2"), an existing DCI field may be re-used to trigger retransmission. For instance, a radio resource control (RRC)-configurable special value of an A-CSI-request field may trigger retransmission. Alternatively, multiple special values of the A-CSI-request field may trigger retransmission and may select between options on the content. As an example, <special value #1> may specify the earliest codebook stored, and <special value #2> may specify all the codebooks stored.

Under the first proposed scheme, with respect to triggering of retransmission and resource assignment, in Option R2, network node 125 may send DL-DCI to UE 110 to trigger concatenation of stored HARQ information (or parts thereof) to the currently selected codebook. The concatenated size may be used with the PRI field to select the PUCCH resource(s) used for transmission. Under a first approach in Option R2 (hereinafter referred to as "Option R2-1"), a new DCI field may be introduced for signaling. For instance, a single bit as the new DCI field may be used to trigger concatenation. Alternatively, or additionally, slot index (or indices) pointing back in time may be used to select the codebook(s) requested for retransmission and to trigger concatenation. Under a second approach in Option R2 (hereinafter referred to as "Option R2-2"), an existing DCI field may be re-used for signaling. As an example, a pre-configured special value of K1 or combination of K1 and another field (e.g., HARQ) may trigger concatenation. As another example, a pre-configured special value of HARQ process identification (ID) (or special value in another field different from K1) may trigger concatenation. Under a third approach in Option R2 (hereinafter referred to as "Option R2-3"), implicit signaling may be used (e.g., based on radio network temporary identifier (RNTI) and/or search space) to trigger concatenation. Under a fourth approach in Option R2 (hereinafter referred to as "Option R2-4"), concatenation may be automatic to the earliest PUCCH that is transmitted next or after a current slot or sub-slot.

Figure 3:
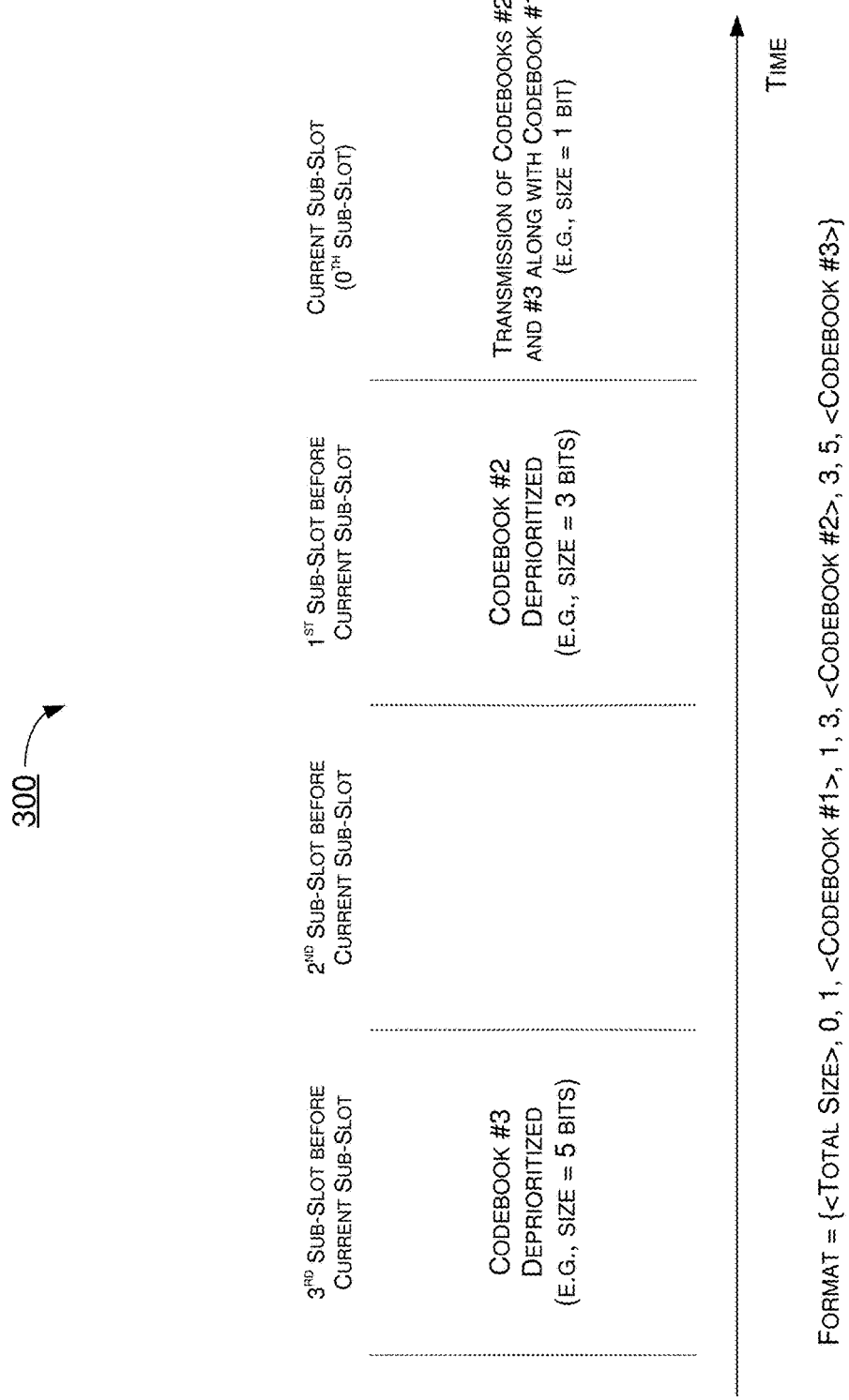
FIG. 3 is a diagram of an example scenario in accordance with an implementation of the present disclosure.

FIG. 3 illustrates an example scenario 300 of implementing the first proposed scheme in accordance with the present disclosure. In FIG. 3, an example codebook format in retransmission in full is shown. In scenario 300, when a codebook or a concatenation of codebooks is transmitted according to the first proposed scheme over PUSCH or PUCCH, the format may be, for example and without limitation: {slot #1, size #1, codebook #1, slot #2, size #2, codebook #2 . . . }. The slot (or sub-slot) and size may be prepended to each codebook. The total size may also be prepended. Moreover, instead of bytes, 4-bit nibbles may be used as well for certain members within the format. Any variations and derivatives thereof are not precluded.

Under the first proposed scheme, with respect to payload content in retransmission, one of a number of options may be implemented. In a first option, a specific single codebook may be retransmitted. For instance, at most a single codebook may be stored for retransmission. Alternatively, the earliest or the latest codebook may be retrieved for retransmission. In a second option, multiple codebooks may be selected by DCI for retransmission. For instance, scheduling DCI may specify an ordered list of pointers to selected previous slots (or sub-slots) where de-prioritization took place to request retransmission of the corresponding codebooks. In a third option, all codebooks may be retransmitted. For instance, the report may contain a pointer to a previous slot (or sub-slot) for each codebook that is retransmitted, specifying where the abortion occurred. As an example, the ordered list mentioned above may be a bitmap (e.g., 16-bit bitmap) where each bit may represent a slot (or sub-slot used as K1 unit). In an event that retransmission is on PUSCH, with the allocation and modulation and coding scheme (MCS) resulting in a larger bit size than the payload, then the latter may be zero-padded or padded with replicas.

FIG. 4, FIG. 5, FIG. 6 and FIG. 7 illustrate example scenario 400, example scenario 500, example scenario 600 and example scenario 700, respectively, of implementing the first proposed scheme in accordance with the present disclosure.

Figure 4:
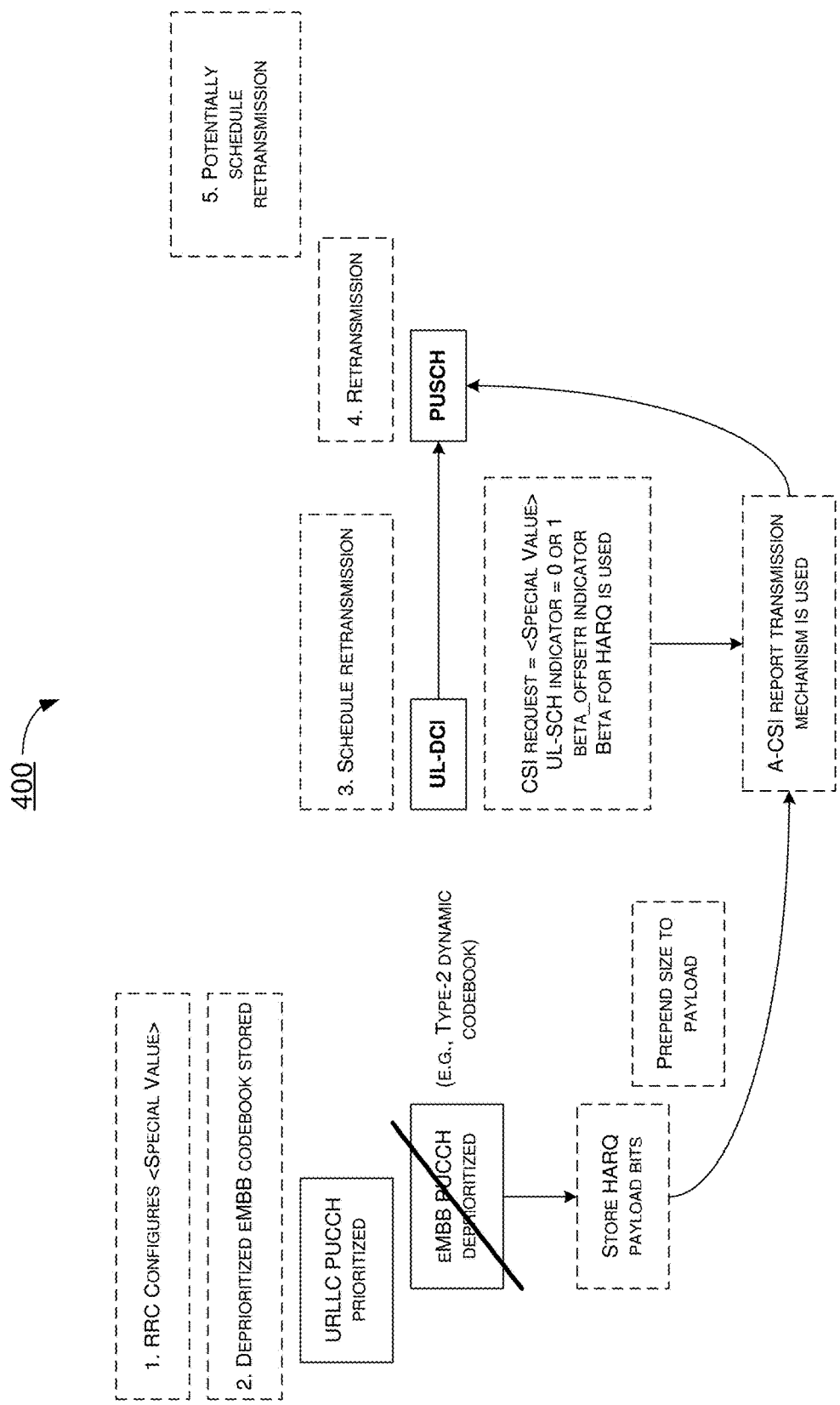
FIG. 4 is a diagram of an example scenario in accordance with an implementation of the present disclosure.

Referring to FIG. 4, in scenario 400, at most a single codebook is stored and retransmitted over PUSCH. In scenario 400, at first, UE 110 may receive from network node 125 a RRC signaling that configures a special value (e.g., a RRC-configurable special value of an A-CSI field) as a trigger to deprioritize a HARQ codebook for an eMBB traffic (e.g., by indicating a scheduled transmission of a URLLC traffic, which is prioritized over the eMBB traffic). In response, UE 110 may store payload bits of this HARQ codebook for retransmission at a later time. UE 110 may also prepend a size of the HARQ codebook to the payload. Next, UE 110 may schedule retransmission of the payload in a subsequent slot or sub-slot (e.g., as a result of receiving a UL-DCI signaling from network node 125). UE 110 may utilize the A-CSI reporting mechanism in retransmitting the payload (e.g., in a PUSCH).

Figure 5:
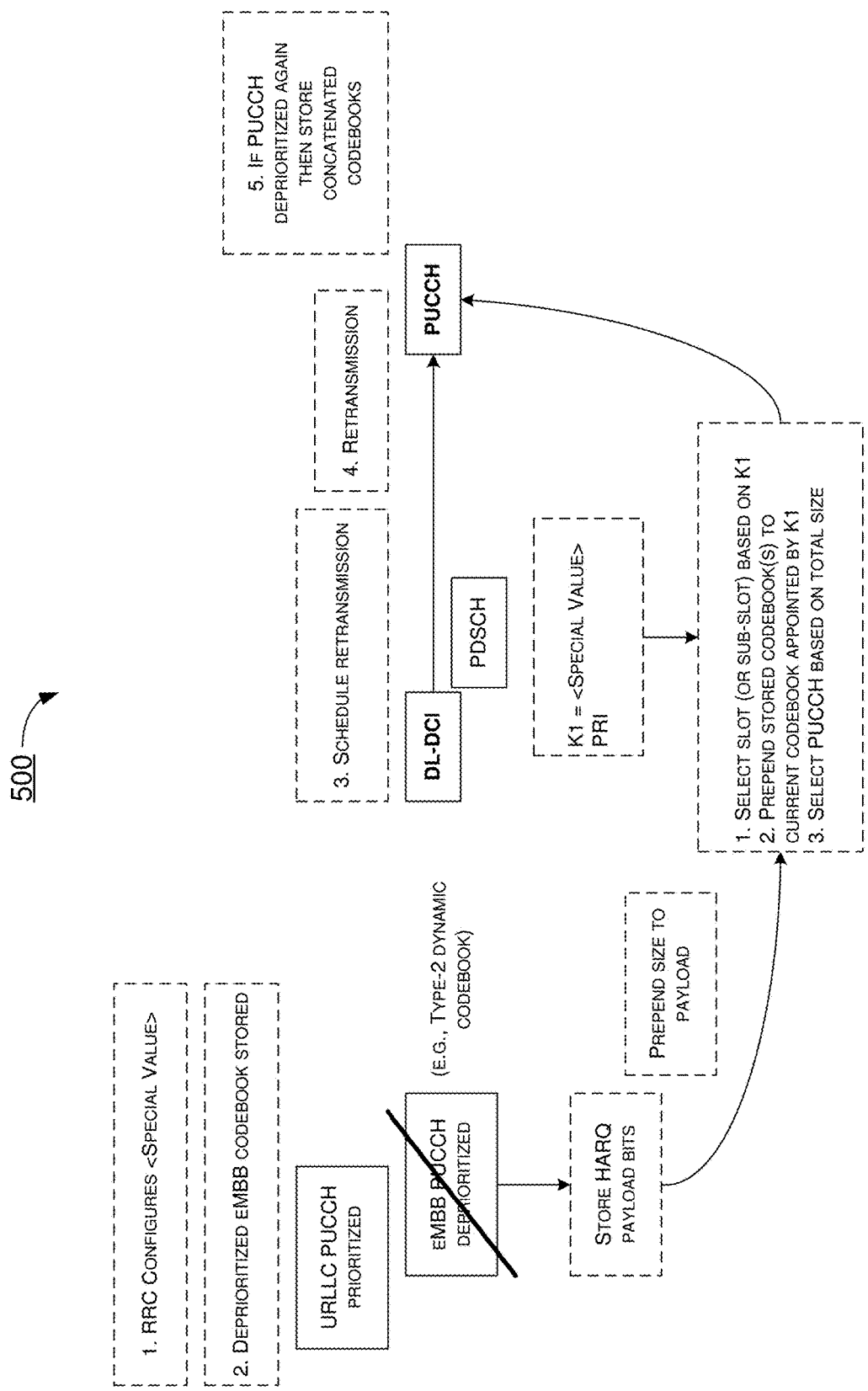
FIG. 5 is a diagram of an example scenario in accordance with an implementation of the present disclosure.

Referring to FIG. 5, in scenario 500, at most a single codebook is stored and retransmitted over PUCCH. In scenario 500, at first, UE 110 may receive from network node 125 a RRC signaling that configures a special value (e.g., a RRC-configurable special value of an A-CSI field) as a trigger to deprioritize a HARQ codebook for an eMBB traffic (e.g., by indicating a scheduled transmission of a URLLC traffic, which is prioritized over the eMBB traffic). In response, UE 110 may store payload bits of this HARQ codebook for retransmission at a later time. UE 110 may receive a trigger (e.g., DL-DCI with a pre-configured value for K1, which specifies HARQ ACK/NACK timing for a specific PDSCH) from network node 125. Accordingly, UE 110 may select a slot or sub-slot based on the K1. UE 110 may also prepend the stored codebook to a current codebook appointed by the K1 to form concatenated codebooks. UE 110 may further select a PUCCH based on a total size of the concatenated codebooks. Next, UE 110 may retransmit the concatenated codebooks in a PUCCH. In case the PUCCH is deprioritized then UE 110 may store the concatenated codebooks.

Figure 6:
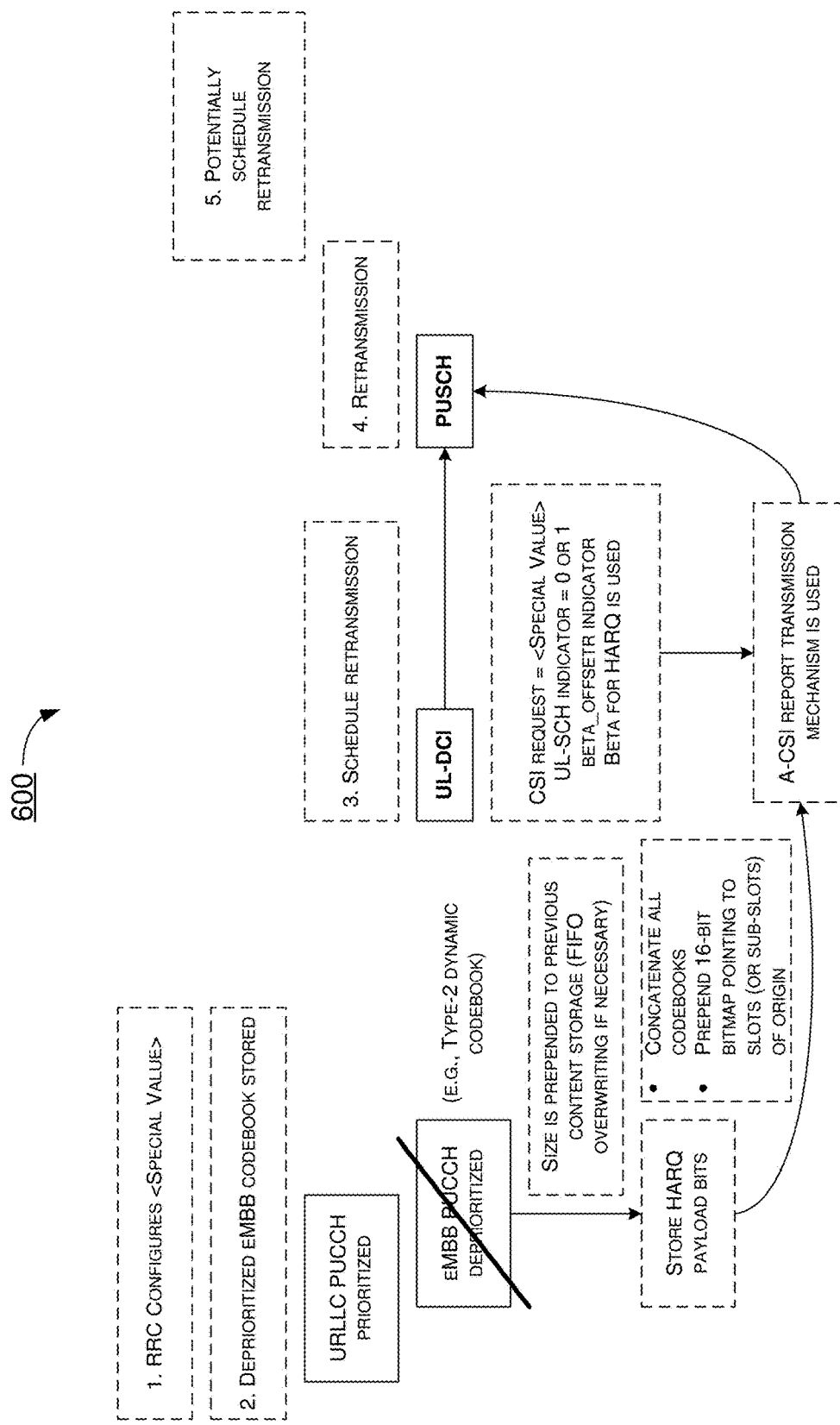
FIG. 6 is a diagram of an example scenario in accordance with an implementation of the present disclosure.

Referring to FIG. 6, in scenario 600, multiple codebooks are stored in a FIFO arrangement and retransmitted together over PUSCH. In scenario 600, at first, UE 110 may receive from network node 125 a RRC signaling that configures a special value (e.g., a RRC-configurable special value of an A-CSI field) as a trigger to deprioritize a HARQ codebook for an eMBB traffic (e.g., by indicating a scheduled transmission of a URLLC traffic, which is prioritized over the eMBB traffic). In response, UE 110 may store payload bits of this HARQ codebook for retransmission at a later time. The size of the codebook may be prepended to content already in storage, and FIFO arrangement may be utilized in overwriting existing stored payload. UE 110 may concatenate all stored codebooks, and UE 110 may prepend a bitmap (e.g., 16-bit bitmap) pointing to previous slots or sub-slots of origin of all the stored codebooks. Next, UE 110 may schedule retransmission of the payload in a subsequent slot or sub-slot (e.g., as a result of receiving a UL-DCI signaling from network node 125). UE 110 may utilize the A-CSI reporting mechanism in retransmitting the payload (e.g., in a PUSCH).

Figure 7:
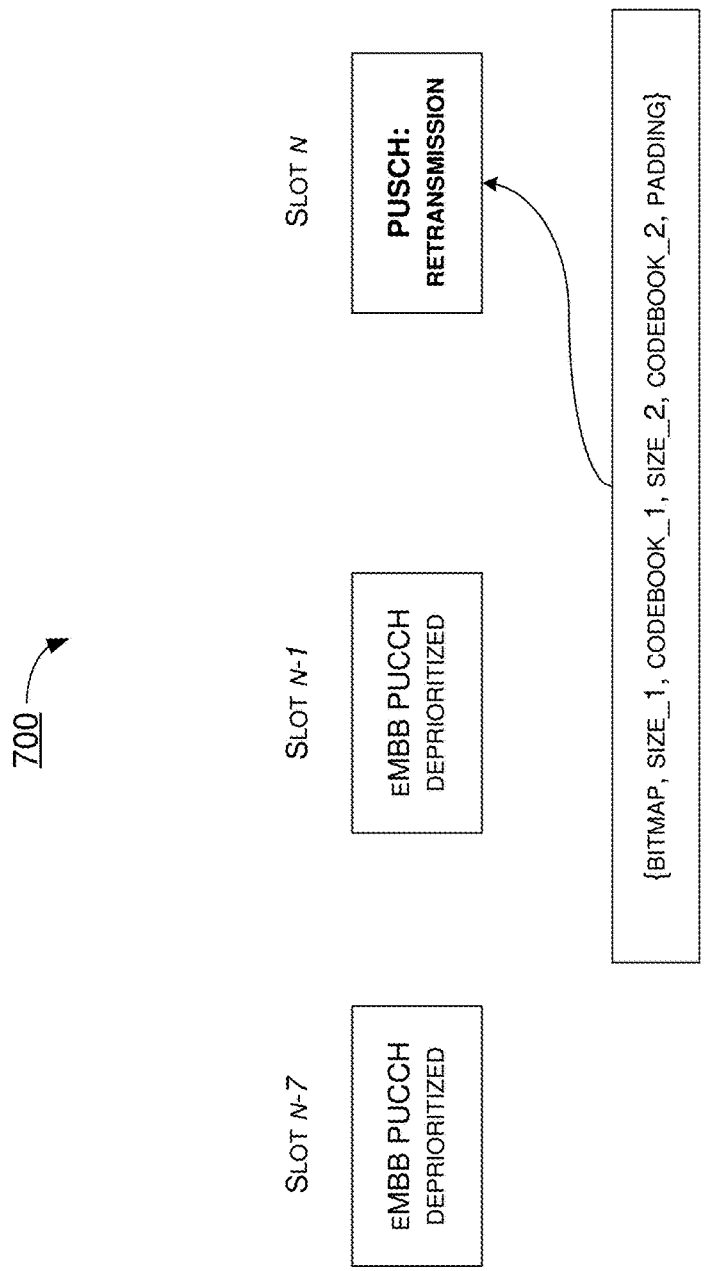
FIG. 7 is a diagram of an example scenario in accordance with an implementation of the present disclosure.

Referring to FIG. 7, in scenario 700, multiple codebooks are stored and retransmitted over PUSCH. In scenario 700, a HARQ codebook (e.g., codebook 1) associated with an eMBB traffic scheduled for transmission in slot n–7 may be deprioritized. Moreover, another HARQ codebook (e.g., codebook 2) associated with the eMBB traffic scheduled for transmission in slot n–1 may also be deprioritized. Then, codebook 1 and codebook 2 may be concatenated for retransmission in slot n. A bitmap (e.g., 16-bit bitmap) may be prepended with bits indicating from which of a plurality of previous slots or sub-slots codebook 1 and codebook 2 originated. The retransmission may optionally include padding bid(s) as necessary.

Under the second proposed scheme, with respect to transmitting status of HARQ process(es) on request, instead of storing the HARQ-ACK codebook an alternative may be to transmit HARQ-ACK based on the status of current HARQ process(es). In a first option, network node 125 may transmit a trigger (e.g., using UL-DCI or DL-DCI) to UE 110 and, in response, UE 110 may report the current ACK/NACK status for all the HARQ processes configured by network node 125. In a second option, network node 125 may transmit a trigger (e.g., using UL-DCI or DL-DCI) to UE 110 and, in response, UE 110 may report the current ACK/NACK status of signaled HAR process(es) as part of the DCI. The signaling of the HARQ process(es) may be either explicit (e.g., using HARQ process number(s)) or implicit (e.g., through service identification such as for eMBB HARQ process(es)). The content of the ACK/NACK report may be two-state ACK/NACK, three-state ACK/NACK for cancelled ACK/NACK, or "already sent" to specify that the ACK/NACK information has already been sent. Under the proposed scheme, four states may also be possible such as, for example and without limitation, ACK-sent, NACK-sent, ACT-not-sent, NACK-not-sent. Equivalently, the latest ACK/NACK and new data indicator (NDI) bit received with the associated DCI may be indicated for each HARQ process.

Illustrative Implementations

Figure 8:
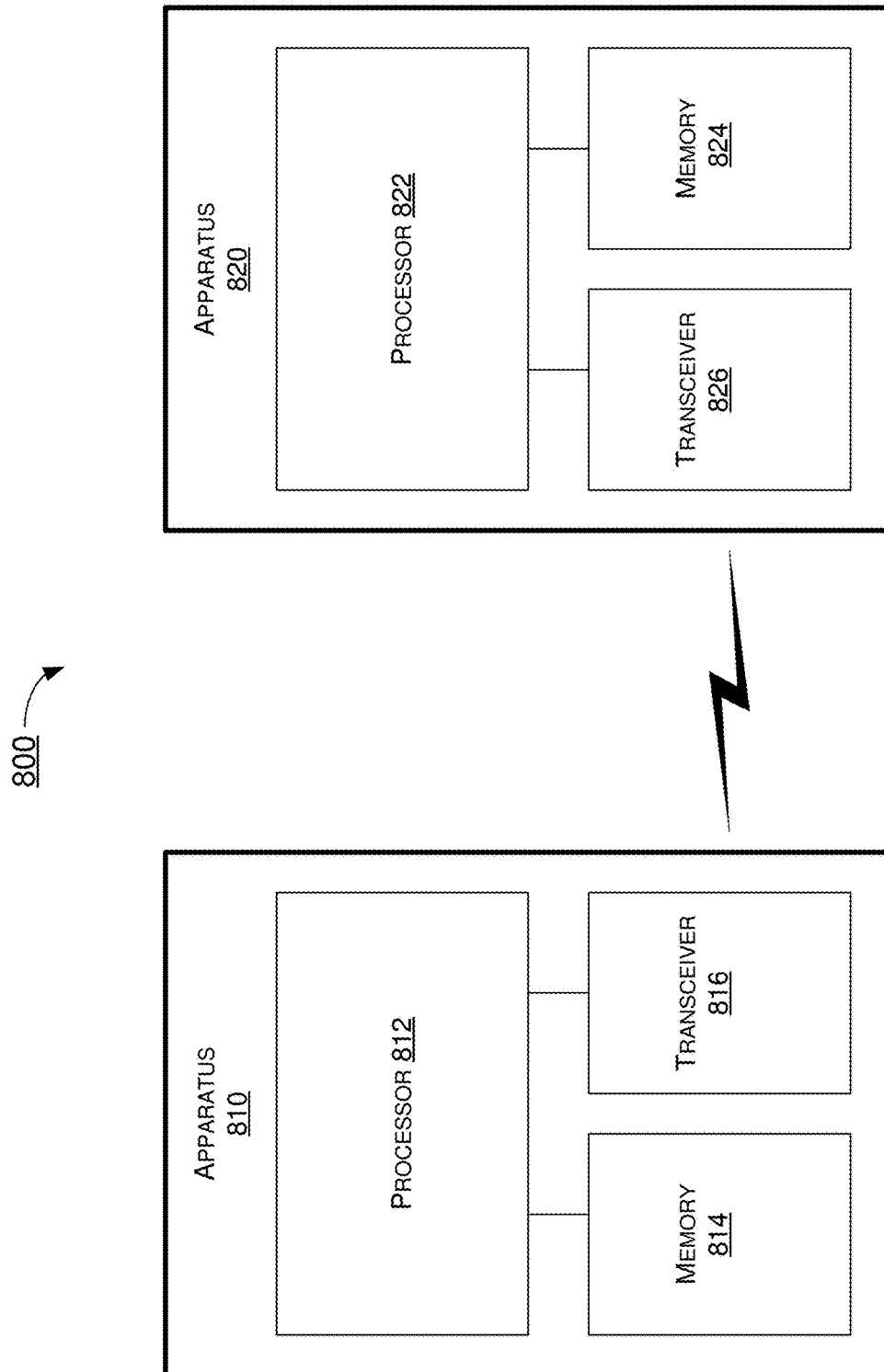
FIG. 8 is a block diagram of an example communication system in accordance with an implementation of the present disclosure.

FIG. 8 illustrates an example system 800 having at least an example apparatus 810 and an example apparatus 820 in accordance with an implementation of the present disclosure. Each of apparatus 810 and apparatus 820 may perform various functions to implement schemes, techniques, processes and methods described herein pertaining to on-demand transmission of aborted HARQ codebook(s) in mobile communications, including the various schemes described above with respect to various proposed designs, concepts, schemes, systems and methods described above as well as processes described below. For instance, apparatus 810 may be an example implementation of UE 110, and apparatus 820 may be an example implementation of network node 125.

Each of apparatus 810 and apparatus 820 may be a part of an electronic apparatus, which may be a network apparatus or a UE (e.g., UE 110), such as a portable or mobile apparatus, a wearable apparatus, a wireless communication apparatus or a computing apparatus. For instance, each of apparatus 810 and apparatus 820 may be implemented in a smartphone, a smart watch, a personal digital assistant, a digital camera, or a computing equipment such as a tablet computer, a laptop computer or a notebook computer. Each of apparatus 810 and apparatus 820 may also be a part of a machine type apparatus, which may be an IoT apparatus such as an immobile or a stationary apparatus, a home apparatus, a wire communication apparatus or a computing apparatus. For instance, each of apparatus 810 and apparatus 820 may be implemented in a smart thermostat, a smart fridge, a smart door lock, a wireless speaker or a home control center. When implemented in or as a network apparatus, apparatus 810 and/or apparatus 820 may be implemented in a network node (e.g., network node 125), such as an eNB in an LTE, LTE-Advanced or LTE-Advanced Pro network or in a gNB or TRP in a 5G network, an NR network or an IoT network.

In some implementations, each of apparatus 810 and apparatus 820 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 810 and apparatus 820 may be implemented in or as a network apparatus or a UE. Each of apparatus 810 and apparatus 820 may include at least some of those components shown in FIG. 8 such as a processor 812 and a processor 822, respectively, for example. Each of apparatus 810 and apparatus 820 may further include one or more other components not pertinent to the proposed scheme of the present disclosure (e.g., internal power supply, display device and/or user interface device), and, thus, such component(s) of apparatus 810 and apparatus 820 are neither shown in FIG. 8 nor described below in the interest of simplicity and brevity.

In one aspect, each of processor 812 and processor 822 may be implemented in the form of one or more single-core processors, one or more multi-core processors, one or more RISC processors or one or more CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including those pertaining to on-demand transmission of aborted HARQ codebook(s) in mobile communications in accordance with various implementations of the present disclosure.

In some implementations, apparatus 810 may also include a transceiver 816 coupled to processor 812. Transceiver 816 may be capable of wirelessly transmitting and receiving data. In some implementations, apparatus 820 may also include a transceiver 826 coupled to processor 822. Transceiver 826 may include a transceiver capable of wirelessly transmitting and receiving data.

In some implementations, apparatus 810 may further include a memory 814 coupled to processor 812 and capable of being accessed by processor 812 and storing data therein. In some implementations, apparatus 820 may further include a memory 824 coupled to processor 822 and capable of being accessed by processor 822 and storing data therein. Each of memory 814 and memory 824 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 814 and memory 824 may include a type of read-only memory (ROM) such as mask ROM, programmable ROM (PROM), erasable programmable ROM (EPROM) and/or electrically erasable programmable ROM (EEPROM). Alternatively, or additionally, each of memory 814 and memory 824 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 810 and apparatus 820 may be a communication entity capable of communicating with each other using various proposed schemes in accordance with the present disclosure. For illustrative purposes and without limitation, a description of capabilities of apparatus 810, as a UE, and apparatus 820, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 810 as a UE (e.g., UE 110), the same is also applicable to apparatus 820 as a network node or base station such as a gNB, TRP or eNodeB (e.g., network node 125) of a wireless network (e.g., wireless network 120) such as a 8G NR mobile network.

Under a proposed scheme in accordance with the present disclosure, processor 812 of apparatus 810 may abort a transmission of a first message of a first type of traffic to a wireless network (e.g., wireless network 120) via apparatus 820 in a first slot or sub-slot without resuming the transmission in the first slot or sub-slot. Additionally, processor 812 may store, in memory 814, a payload of the first message. Moreover, processor 812 may retransmit, via transceiver 816, the payload in full to the wireless network via apparatus 820 in a second slot or sub-slot that is subsequent the first slot or sub-slot.

In some implementations, in aborting the transmission of the first message, processor 812 may abort the transmission of the first message upon detecting that a transmission of a second message of a second type of traffic is also scheduled for the first slot or sub-slot, and wherein a priority of the second type of traffic is higher than a priority of the first type of traffic.

In some implementations, the first message may include a first HARQ codebook for the first type of traffic, and the second message may include a second HARQ codebook for the second type of traffic. In such cases, the first type of traffic may include an eMBB traffic, and the second type of traffic may include a URLLC traffic.

In some implementations, in storing the payload of the first message, processor 812 may store at most one payload at a time such that: (a) any stored payload of any earlier message is overwritten by the payload of the first message, and (b) the payload of the first message is stored until overwritten by a second payload of a later message for which a transmission thereof is aborted subsequent to the second slot or sub-slot.

In some implementations, in storing the payload of the first message, processor 812 may store more than one payload at a time such that a plurality of payloads including the payload of the first message are stored according to a FIFO arrangement until an earliest payload of the plurality of payloads is overwritten by a new payload of a new message for which a transmission thereof is aborted subsequent to the second slot or sub-slot.

In some implementations, in storing the payload of the first message, processor 812 may store a respective payload associated with each transmission whether aborted or not such that one payload associated with a later transmission is stored to overwrite another payload associated with an earlier transmission.

In some implementations, in retransmitting the payload in the second slot or sub-slot, processor 812 may autonomously transmit the payload using an originally assigned PUCCH resource in the second slot or sub-slot.

In some implementations, in retransmitting the payload, processor 812 may perform certain operations. For instance, processor 812 may receive, via transceiver 816, a trigger from the wireless network via apparatus 820. Moreover, processor 812 may retransmit, via transceiver 816, the payload in a PUSCH responsive to receiving the trigger.

In some implementations, in receiving the trigger, processor 812 may receive an UL-DCI signaling with the trigger indicated by a new DCI field or an existing DCI field. In an event that the trigger is indicated by the new DCI field, the new DCI field may include either a single bit or one or more slot indices pointing back in time and selecting the payload for retransmission. In an event that the trigger is indicated by the existing DCI field, a RRC-configurable value of an A-CSI field may trigger the retransmitting.

In some implementations, in retransmitting the payload, processor 812 may perform certain operations. For instance, processor 812 may receive, via transceiver 816, a trigger from the wireless network via apparatus 820. In response to receiving the trigger, processor 812 may perform some operations. For instance, processor 812 may concatenate the payload with one or more other payloads to form concatenated payloads. Moreover, processor 812 may transmit, via transceiver 816, the concatenated payloads in a PUCCH.

In some implementations, in receiving the trigger, processor 812 may receive a DL-DCI signaling from the wireless network via apparatus 820 with the trigger indicated by a new DCI field or an existing DCI field. In an event that the trigger is indicated by the new DCI field, the new DCI field may include either a single bit or one or more slot indices pointing back in time and selecting the one or more other payloads. In an event that the trigger is indicated by the existing DCI field, the existing DCI field may include either: (a) a pre-configured value of a parameter (K1) that specifies HARQ ACK/NACK timing for a specific PDSCH; or (b) a pre-configured value of a HARQ process ID or a value in another field different from the K1.

Alternatively, the trigger may be implicitly indicated based on a RNTI or a search space.

In some implementations, in transmitting the concatenated payloads in the PUCCH, processor 812 may transmit the concatenated payloads in an earliest PUCCH after a current slot or sub-slot.

In some implementations, in retransmitting the payload, processor 812 may transmit a single HARQ codebook, multiple HARQ codebooks that are selected, or all stored HARQ codebooks associated with transmissions previously aborted. In an event that the retransmitting of the payload involves transmitting the multiple HARQ codebooks, the multiple HARQ codebooks may be selected by a DCI signaling from the wireless network that specifies an ordered list of pointers selecting previous slots or sub-slots during which transmissions of the multiple HARQ codebooks were aborted. In an event that the retransmitting of the payload involves transmitting all the stored HARQ codebooks associated with the transmissions previously aborted, the retransmitting of the payload may further involve transmitting a report containing a plurality of pointers each pointing to a respective previous slot or sub-slot for each of all the stored HARQ codebooks. In such cases, the ordered list may include a bitmap (e.g., 16-bit bitmap) having a plurality of bits each of which representing a respective one of the previous slots or sub-slots.

Under a proposed scheme in accordance with the present disclosure, processor 812 of apparatus 810 may receive, via transceiver 816, a trigger from a wireless network (e.g., wireless network 120) via apparatus 820. Moreover, processor 812 may report, via transceiver 816, status of one or more HARQ processes to the wireless network responsive to receiving the trigger.

In some implementations, the trigger may include a DCI signaling (e.g., UL-DCI or DL-DCI). In such cases, in reporting the status of the one or more HARQ processes, processor 812 may report current ACK/NACK status of all HARQ processes configured by the wireless network. Alternatively, processor 812 may report current ACK/NACK status of at least one HARQ process signaled by the trigger either explicitly by an associated HARQ process number or implicitly by an associated service identification.

Illustrative Processes

Figure 9:
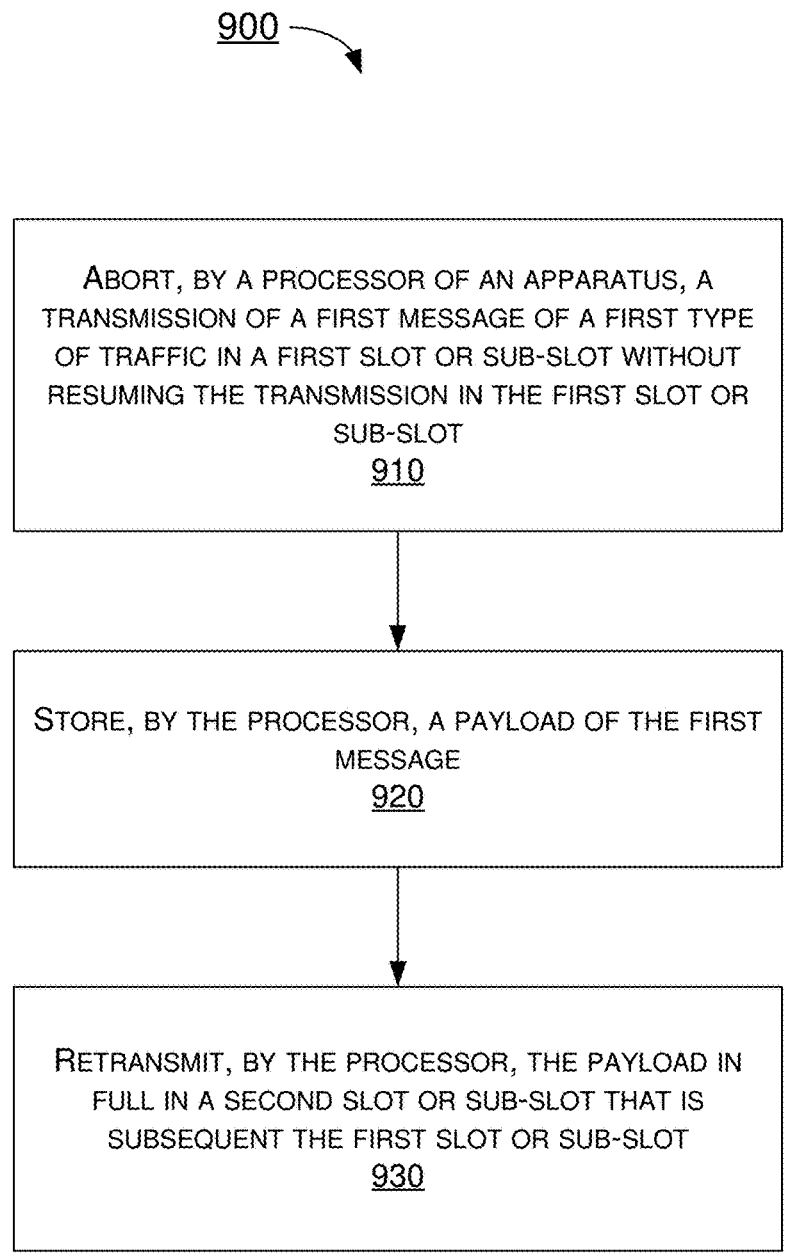
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to on-demand transmission of aborted HARQ codebook(s) in mobile communications in accordance with the present disclosure. Process 900 may include one or more operations, actions, or functions as illustrated by one or more of blocks 910, 920 and 930. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in apparatus 810 and apparatus 820 as well as any variations thereof. Solely for illustrative purposes and without limiting the scope, process 900 is described below in the context of apparatus 810 as a UE (e.g., UE 110) and apparatus 820 as a network node (e.g., network node 125) of a wireless network (e.g., wireless network 120) such as a 5G/NR mobile network. Process 900 may begin at block 910.

At 910, process 900 may involve processor 812 of apparatus 810 aborting a transmission of a first message of a first type of traffic to a wireless network (e.g., wireless network 120) via apparatus 820 in a first slot or sub-slot without resuming the transmission in the first slot or sub-slot. Process 900 may proceed from 910 to 920.

At 920, process 900 may involve processor 812 storing, in memory 814, a payload of the first message. Process 900 may proceed from 920 to 930.

At 930, process 900 may involve processor 812 retransmitting, via transceiver 816, the payload in full to the wireless network via apparatus 820 in a second slot or sub-slot that is subsequent the first slot or sub-slot.

In some implementations, in aborting the transmission of the first message, process 900 may involve processor 812 aborting the transmission of the first message upon detecting that a transmission of a second message of a second type of traffic is also scheduled for the first slot or sub-slot, and wherein a priority of the second type of traffic is higher than a priority of the first type of traffic.

In some implementations, the first message may include a first HARQ codebook for the first type of traffic, and the second message may include a second HARQ codebook for the second type of traffic. In such cases, the first type of traffic may include an eMBB traffic, and the second type of traffic may include a URLLC traffic.

In some implementations, in storing the payload of the first message, process 900 may involve processor 812 storing at most one payload at a time such that: (a) any stored payload of any earlier message is overwritten by the payload of the first message, and (b) the payload of the first message is stored until overwritten by a second payload of a later message for which a transmission thereof is aborted subsequent to the second slot or sub-slot.

In some implementations, in storing the payload of the first message, process 900 may involve processor 812 storing more than one payload at a time such that a plurality of payloads including the payload of the first message are stored according to a FIFO arrangement until an earliest payload of the plurality of payloads is overwritten by a new payload of a new message for which a transmission thereof is aborted subsequent to the second slot or sub-slot.

In some implementations, in storing the payload of the first message, process 900 may involve processor 812 storing a respective payload associated with each transmission whether aborted or not such that one payload associated with a later transmission is stored to overwrite another payload associated with an earlier transmission.

In some implementations, in retransmitting the payload in the second slot or sub-slot, process 900 may involve processor 812 autonomously transmitting the payload using an originally assigned PUCCH resource in the second slot or sub-slot.

In some implementations, in retransmitting the payload, process 900 may involve processor 812 performing certain operations. For instance, process 900 may involve processor 812 receiving, via transceiver 816, a trigger from the wireless network via apparatus 820. Moreover, process 900 may involve processor 812 retransmitting, via transceiver 816, the payload in a PUSCH responsive to receiving the trigger.

In some implementations, in receiving the trigger, process 900 may involve processor 812 receiving an UL-DCI signaling with the trigger indicated by a new DCI field or an existing DCI field. In an event that the trigger is indicated by the new DCI field, the new DCI field may include either a single bit or one or more slot indices pointing back in time and selecting the payload for retransmission. In an event that the trigger is indicated by the existing DCI field, a RRC-configurable value of an A-CSI field may trigger the retransmitting.

In some implementations, in retransmitting the payload, process 900 may involve processor 812 performing certain operations. For instance, process 900 may involve processor 812 receiving, via transceiver 816, a trigger from the wireless network via apparatus 820. In response to receiving the trigger, process 900 may involve processor 812 performing some operations. For instance, process 900 may involve processor 812 concatenating the payload with one or more other payloads to form concatenated payloads. Moreover, process 900 may involve processor 812 transmitting, via transceiver 816, the concatenated payloads in a PUCCH.

In some implementations, in receiving the trigger, process 900 may involve processor 812 receiving a DL-DCI signaling from the wireless network via apparatus 820 with the trigger indicated by a new DCI field or an existing DCI field. In an event that the trigger is indicated by the new DCI field, the new DCI field may include either a single bit or one or more slot indices pointing back in time and selecting the one or more other payloads. In an event that the trigger is indicated by the existing DCI field, the existing DCI field may include either: (a) a pre-configured value of a parameter (K1) that specifies HARQ ACK/NACK timing for a specific PDSCH; or (b) a pre-configured value of a HARQ process ID or a value in another field different from the K1.

Alternatively, the trigger may be implicitly indicated based on a RNTI or a search space.

In some implementations, in transmitting the concatenated payloads in the PUCCH, process 900 may involve processor 812 transmitting the concatenated payloads in an earliest PUCCH after a current slot or sub-slot.

In some implementations, in retransmitting the payload, process 900 may involve processor 812 transmitting a single HARQ codebook, multiple HARQ codebooks that are selected, or all stored HARQ codebooks associated with transmissions previously aborted. In an event that the retransmitting of the payload involves transmitting the multiple HARQ codebooks, the multiple HARQ codebooks may be selected by a DCI signaling from the wireless network that specifies an ordered list of pointers selecting previous slots or sub-slots during which transmissions of the multiple HARQ codebooks were aborted. In an event that the retransmitting of the payload involves transmitting all the stored HARQ codebooks associated with the transmissions previously aborted, the retransmitting of the payload may further involve transmitting a report containing a plurality of pointers each pointing to a respective previous slot or sub-slot for each of all the stored HARQ codebooks. In such cases, the ordered list may include a bitmap (e.g., 16-bit bitmap) having a plurality of bits each of which representing a respective one of the previous slots or sub-slots.

Figure 10:
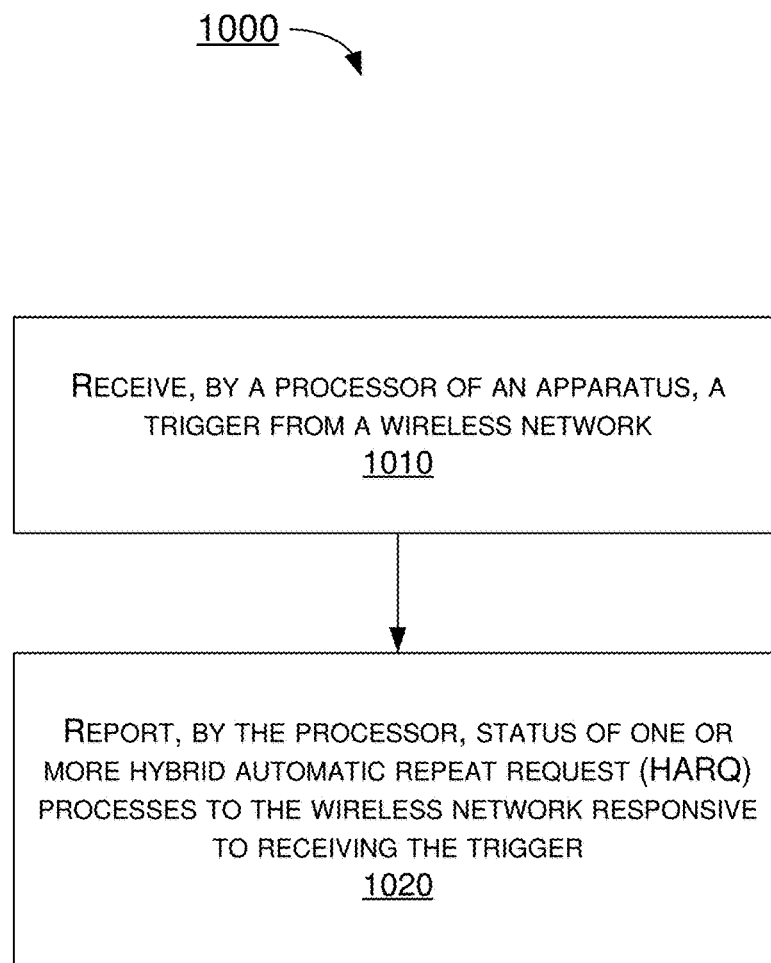
FIG. 10 is a flowchart of an example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to on-demand transmission of aborted HARQ codebook(s) in mobile communications in accordance with the present disclosure. Process 1000 may include one or more operations, actions, or functions as illustrated by one or more of blocks 1010 and 1020. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 810 and apparatus 820 as well as any variations thereof. Solely for illustrative purposes and without limiting the scope, process 1000 is described below in the context of apparatus 810 as a UE (e.g., UE 110) and apparatus 820 as a network node (e.g., network node 125) of a wireless network (e.g., wireless network 120) such as a 5G/NR mobile network. Process 1000 may begin at block 1010.

At 1010, process 1000 may involve processor 812 of apparatus 810 receiving, via transceiver 816, a trigger from a wireless network (e.g., wireless network 120) via apparatus 820. Process 1000 may proceed from 1010 to 1020.

At 1020, process 1000 may involve processor 812 reporting, via transceiver 816, status of one or more HARQ processes to the wireless network responsive to receiving the trigger.

In some implementations, the trigger may include a DCI signaling (e.g., UL-DCI or DL-DCI). In such cases, in reporting the status of the one or more HARQ processes, process 1000 may involve processor 812 reporting current ACK/NACK status of all HARQ processes configured by the wireless network. Alternatively, process 1000 may involve processor 812 reporting current ACK/NACK status of at least one HARQ process signaled by the trigger either explicitly by an associated HARQ process number or implicitly by an associated service identification.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
aborting, by a processor of an apparatus, a transmission of a first message of a first type of traffic in a first slot or sub-slot without resuming the transmission in the first slot or sub-slot;
storing, by the processor, a payload of the first message; and
retransmitting, by the processor, the payload in full in a second slot or sub-slot that is subsequent the first slot or sub-slot,
wherein the retransmitting of the payload comprises retransmitting the payload responsive to receiving a trigger from a wireless network,
wherein the receiving of the trigger comprises receiving a downlink (DL) downlink control information (DL-DCI) signaling with the trigger indicated by an existing downlink control information (DCI) field, and
wherein the existing DCI field comprises a pre-configured value of a hybrid automatic repeat request (HARQ) process identification (ID) or a value in another field different from a pre-configured value of a parameter (K1) that specifies HARQ acknowledgement and negative acknowledgement (ACK/NACK) timing for a physical downlink shared channel (PDSCH).

2. The method of claim 1, wherein the aborting of the transmission of the first message comprises aborting the transmission of the first message upon detecting that a transmission of a second message of a second type of traffic is also scheduled for the first slot or sub-slot, and wherein a priority of the second type of traffic is higher than a priority of the first type of traffic.

3. The method of claim 2, wherein the first message comprises a first HARQ codebook for the first type of traffic, wherein the second message comprises a second HARQ codebook for the second type of traffic, wherein the first type of traffic comprises an enhanced Mobile Broadband (eMBB) traffic, and wherein the second type of traffic comprises a Ultra-Reliable Low-Latency Communication (URLLC) traffic.

4. The method of claim 1, wherein the storing of the payload of the first message comprises storing at most one payload at a time such that:
any stored payload of any earlier message is overwritten by the payload of the first message, and
the payload of the first message is stored until overwritten by a second payload of a later message for which a transmission thereof is aborted subsequent to the second slot or sub-slot.

5. The method of claim 1, wherein the storing of the payload of the first message comprises storing more than one payload at a time such that a plurality of payloads including the payload of the first message are stored according to a first-in-first-out (FIFO) arrangement until an earliest payload of the plurality of payloads is overwritten by a new payload of a new message for which a transmission thereof is aborted subsequent to the second slot or sub-slot.

6. The method of claim 1, wherein the storing of the payload of the first message comprises storing a respective payload associated with each transmission whether aborted or not such that one payload associated with a later transmission is stored to overwrite another payload associated with an earlier transmission.

7. The method of claim 1, wherein the retransmitting of the payload in the second slot or sub-slot comprises autonomously transmitting the payload using an originally assigned physical uplink control channel (PUCCH) resource in the second slot or sub-slot.

8. The method of claim 1, wherein the retransmitting of the payload comprises:
   receiving, by the processor, a trigger from a wireless network; and
   retransmitting, by the processor, the payload in a physical uplink shared channel (PUSCH) responsive to receiving the trigger.

9. The method of claim 8, wherein the receiving of the trigger comprises receiving an uplink downlink control information (UL-DCI) signaling with the trigger indicated by a new downlink control information (DCI) field or an existing DCI field.

10. The method of claim 9, wherein:
   a radio resource control (RRC)-configurable value of an aperiodic channel state information (A-CSI) field triggers the retransmitting.

11. The method of claim 1, wherein the retransmitting of the payload further comprises:
   responsive to receiving the trigger, performing, by the processor:
      concatenating the payload with one or more other payloads to form concatenated payloads; and
      transmitting the concatenated payloads in a physical uplink control channel (PUCCH).

12. The method of claim 11, wherein the trigger is implicitly indicated based on a radio network temporary identifier (RNTI) or a search space.

13. The method of claim 11, wherein the transmitting of the concatenated payloads in the PUCCH comprises transmitting the concatenated payloads in an earliest PUCCH after a current slot or sub-slot.

14. The method of claim 1, wherein the retransmitting of the payload comprises transmitting a single HARQ codebook, multiple HARQ codebooks that are selected, or all stored HARQ codebooks associated with transmissions previously aborted.

15. The method of claim 14, wherein:
   in an event that the retransmitting of the payload comprises transmitting the multiple HARQ codebooks, the multiple HARQ codebooks are selected by a DCI signaling from a wireless network that specifies an ordered list of pointers selecting previous slots or sub-slots during which transmissions of the multiple HARQ codebooks were aborted, and
   in an event that the retransmitting of the payload comprises transmitting all the stored HARQ codebooks associated with the transmissions previously aborted, the retransmitting of the payload further comprises transmitting a report containing a plurality of pointers each pointing to a respective previous slot or sub-slot for each of all the stored HARQ codebooks.

16. The method of claim 15, wherein the ordered list comprises a bitmap having a plurality of bits each of which representing a respective one of the previous slots or sub-slots.

17. A method, comprising:
   receiving, by a processor of an apparatus, a trigger from a wireless network; and
   reporting, by the processor, status of one or more hybrid automatic repeat request (HARQ) processes to the wireless network responsive to receiving the trigger,
   wherein the trigger comprises a downlink (DL) downlink control information (DL-DCI) signaling with the trigger indicated by an existing downlink control information (DCI) field, and
   wherein the existing DCI field comprises a pre-configured value of a HARQ process identification (ID) or a value in another field different from a pre-configured value of a parameter (K1) that specifies HARQ acknowledgement and negative acknowledgement (ACK/NACK) timing for a physical downlink shared channel (PDSCH).

18. The method of claim 17, wherein the trigger comprises a DCI signaling, and wherein the reporting of the status of the one or more HARQ processes comprises:
   reporting current ACK/NACK status of all HARQ processes configured by the wireless network; or
   reporting current ACK/NACK status of at least one HARQ process signaled by the trigger either explicitly by an associated HARQ process number or implicitly by an associated service identification.

* * * * *